United States Patent [19]

Skarvada

[11] 4,338,670
[45] Jul. 6, 1982

[54] METHOD AND APPARATUS FOR GENERATING A CONTROL SIGNAL AS A FUNCTION OF A PLURALITY OF INTERMEDIATE CONTROL SIGNALS

[75] Inventor: Thomas Skarvada, Woodland Hills, Calif.

[73] Assignee: Crane Co., Chicago, Ill.

[21] Appl. No.: 147,594

[22] Filed: May 7, 1980

[51] Int. Cl.³ .................. B60T 8/00; G05B 19/02; G06F 15/20
[52] U.S. Cl. .................. 364/426; 303/95; 318/610; 318/636; 364/183
[58] Field of Search .................. 364/105, 118, 426; 318/610, 621, 636; 303/95, 97, 109, 93

[56] References Cited

U.S. PATENT DOCUMENTS

| | | | |
|---|---|---|---|
| 3,669,508 | 6/1972 | Attri | 244/111 X |
| 3,724,916 | 4/1973 | Hirzel | 303/109 |
| 3,770,946 | 11/1973 | Fertik et al. | 318/610 X |
| 4,025,763 | 5/1977 | Kleiss | 364/118 |
| 4,068,903 | 1/1978 | Straub | 303/93 X |
| 4,069,413 | 1/1978 | Rutledge et al. | 364/118 |
| 4,180,223 | 12/1979 | Amberg | 303/93 X |
| 4,184,203 | 1/1980 | Skarvada | 364/426 |

Primary Examiner—Jerry Smith
Attorney, Agent, or Firm—Hume, Clement, Brinks, William & Olds, Ltd.

[57] ABSTRACT

An antiskid brake control system responsive to a periodically posted wheel signal operates to generate and store a modulator control signal and a transient control signal. The control system then waits until a new value of the wheel signal is posted, and then promptly generates a lead signal as a function of the new value. This lead signal is then promptly combined with the stored modulator and transient control signals to produce a composite brake control signal. In this way the time delay between the posting of a new value of the wheel signal and the generation of a new lead signal and composite signal is minimized.

12 Claims, 2 Drawing Figures

FIG.1

METHOD AND APPARATUS FOR GENERATING A CONTROL SIGNAL AS A FUNCTION OF A PLURALITY OF INTERMEDIATE CONTROL SIGNALS

BACKGROUND OF THE INVENTION

The present invention is directed to an improved control apparatus for control systems such as antiskid brake control systems.

Sophisticated control systems such as antiskid control systems often include three or more subsystems for generating intermediate control signals. For example, the antiskid control system shown in U.S. Pat. No. 3,724,916, issued Apr. 3, 1973 to Edgar A. Hirzel, is an analog control system which includes a modulator circuit for generating a first intermediate control signal as a time integral function of an input signal and a transient control circuit for generating a second intermediate control signal. In addition, it is a common practice to include lead circuits for generating another intermediate control signal as a function of a time derivative of wheel speed. Typically, these intermediate control signals are then combined to produce a composite control signal which is used to modify the action of the brake application means to reduce wheel skidding and optimize braking efficiency.

In the case of analog circuitry, it is generally possible for each of the subsystems for generating intermediate control signals to function in parallel. In this manner the time delay between the time when the input signal (usually wheel velocity) changes and the time when the composite control signal responds can be kept to an acceptable level.

However, when such control systems are implemented as programmed computers, problems of excessive delay times can result. One type of such a digital antiskid system utilizes a digital wheel speed sensor which posts a new value of the wheel speed at periodic intervals, such as two hundred times a second, for example. Because a computer operates in a serial rather than a parallel manner, excessive delays can result between the time the wheel signal is posted and the time the revised composite control signal is generated by the computer as a combination of the several intermediate control signals.

SUMMARY OF THE INVENTION

The present invention is directed to an improved control system which provides quick response to changing input signals.

According to this invention, a control apparatus is provided which is responsive to input means for generating a periodically adjusted input signal having a first input value at a first time and a second input value at a second time, subsequent to the first time. This control apparatus includes means for generating a first intermediate control signal in response to the first input value, means for storing the first intermediate control signal, means for generating a second intermediate control signal in response to the second input value, and means for combining the stored first intermediate control signal and the second intermediate control signal to generate a composite output signal.

Preferably, the second intermediate control signal is generated promptly after the new input signal is posted and the output signal is generated promptly after the second intermediate control signal. In this way the output signal can be generated before the second intermediate control signal becomes stale.

In the preferred embodiment, the first intermediate control signal is a modulator signal which varies as a time integral function of the input signal and is therefore a relatively smoothly and slowly varying function of the input signal. In this embodiment the second intermediate control signal is a lead signal which varies as a time derivative function of the input signal. The lead signal, being a time derivative function, varies much more rapidly than does the modulator signal. For this reason, it is important that the lead signal be generated promptly after a new input signal is posted and that the output signal be generated promptly after a new lead signal is generated.

This object is achieved by using the stored modulator signal generated in connection with a previous value of the input signal in combination with the newly generated lead signal to arrive at a composite output signal promptly. It is only after the output signal has been generated that the modulator signal is determined and stored for the next cycle. In this way the delay between the time the input signal is posted and the time the lead signal and output signal are generated is minimized. This reduces errors that would otherwise occur if the output signal were not generated until after both the modulator and the lead signals were generated. By ensuring that the most time critical intermediate control signal is generated with minimal delays, the accuracy of the antiskid control system is enhanced. As used herein, the term lead signal is meant to include lead signals incorporating more than one time derivative function as well as signals incorporating only one time derivative function. For example, a lead signal can incorporate both first and second time derivative functions.

The invention, together with further objects and attendant advantages, will be best understood by reference to the following detailed description taken in connection with the accompanying drawings.

DETAILED DESCRIPTION OF A PREFERRED EMBODIMENT

Figure 1:
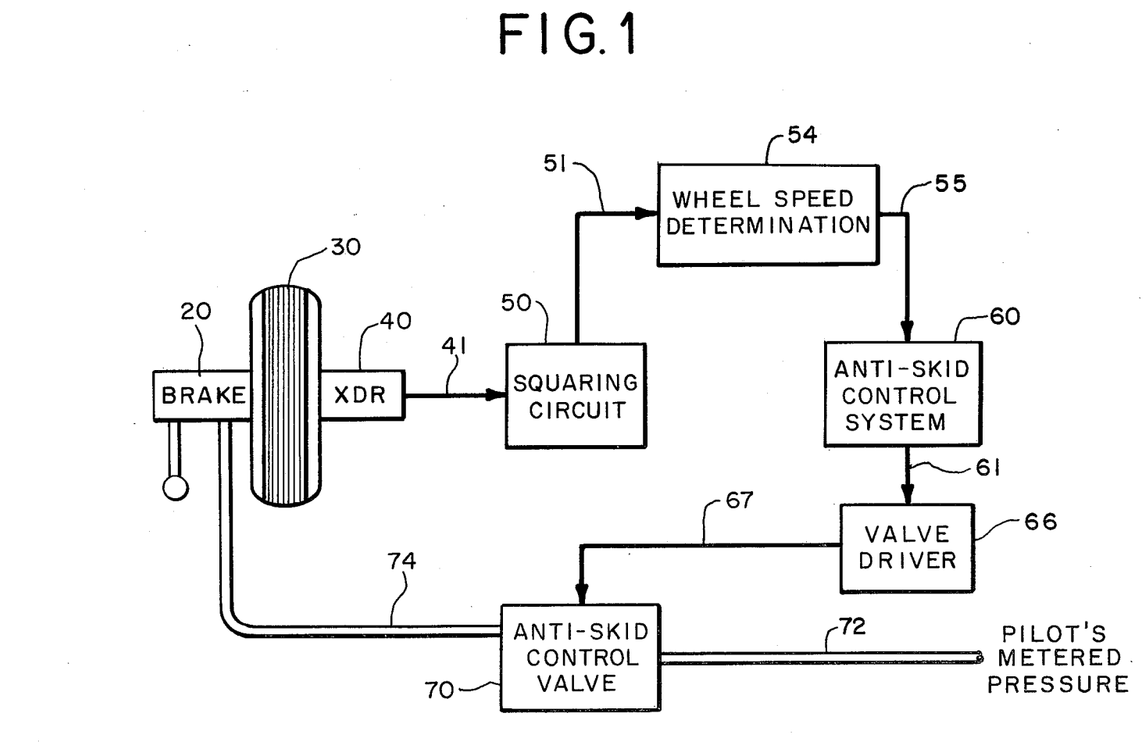
FIG. 1 is a schematic view of an antiskid system including a preferred embodiment of the present invention.

Referring now to the drawings, a preferred embodiment of the improved control apparatus of the present invention will be described in connection with the brake control system shown in FIG. 1. FIG. 1 shows the major components of an antiskid brake control system which provides brake control for the brake 20 of a rotatable wheel 30. The system includes a wheel speed transducer 40 which produces a sinusoidal signal on line 41 having a frequency proportional to the angular velocity of the wheel 30. The signal on line 41 is shaped in a squaring circuit 50 and is then supplied as an input via line 51 to a wheel speed determination unit 54. The wheel speed determination unit 54 processes the input signal on the line 51 to generate a signal indicative of wheel speed. This wheel speed signal is posted periodically and is applied as an input signal to the antiskid control system 60.

In this preferred embodiment, the wheel speed determination unit 54 operates to post a revised wheel speed signal on a regular basis, 203 times per second. The antiskid control system monitors the wheel speed signal. When the wheel speed signal indicates that the wheel 30 is about to go into a skid due to excessive braking force, the antiskid control system 60 generates a brake control signal on line 61. This brake control signal is amplified by a valve driver 66 which is connected to an antiskid control valve 70 via line 67. The antiskid control valve 70 is positioned in the brake line 72 which supplies brake fluid under pressure to the brake 20, and the valve 70 operates in response to the signal on line 67 to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure in the line 72 is passed by the valve 70 via the line 74 into the brake 20. However, if the metered brake pressure exceeds the skid threshold and drives the wheel 30 into a skid, the antiskid system 60 will generate a brake control signal on line 61 which causes the valve 70 to reduce the pressure in the line 74 to a value less than the metered pressure. By reducing the pressure applied to the brake 30, the braking torque is reduced and the wheel 30 is prevented from skidding.

In this preferred embodiment the antiskid control system 60 is implemented as a programmed Z-80 microprocessor marketed by Zilog, Inc., Cupertino, Calif. The relevant portions of the program are listed in assembly language form in Table 1 and are flowcharted in FIG. 2.

As explained above, the wheel speed determination unit 54 generates and posts a new value of the wheel speed signal on a regular basis, 203 times per second in this preferred embodiment. The program listed in Table 1 and flowcharted in FIG. 2 accepts the sixteen most recent measurements of wheel speed, which are labeled VELOC1, VELOC2, . . . VELOC16 in the listing. Here, VELOC1 is the most recently measured wheel speed; VELOC2 is the wheel speed measured in the last cycle, 1/203 of a second before VELOC1; and VELOC16 is the wheel velocity measured fifteen cycles back, 15/203 of a second before VELOC1. In each case, the measurements of wheel speed are scaled to one-tenth of a foot per second at the least significant bit.

The program of Table 1 produces a composite brake control signal which is output on line 61 to the valve driver 66. This composite brake control signal is an eight bit binary number which is linearly related to valve current on line 67 such that a control signal of zero produces a valve current of 55 mA and a control signal of 255 produces a valve current of zero mA. Preferably, the program of Table 1 is executed promptly after each new wheel speed signal is posted, 203 times per second.

This program includes four major functional blocks: Lead Signal Determination; Reference Velocity and Error Signal Determination; Modulator Signal Determination; and Transient Signal Determination. Before discussing the flowchart of FIG. 2, each of these major blocks of the program will be described in general terms.

The Lead Signal Determination block (Parts 1 and 2 of Table 1) generates a lead signal as a function of the first time derivative of the wheel speed signal (Part 1) and the second time derivative of the wheel speed signal (Part 2). Here it should be understood that the term "time derivative" is being used in a broad sense which includes time differences. Because the lead signal is a time derivative function of the wheel speed signal, it varies rapidly with time. Thus, a comparatively small change in the value of the wheel speed signal can result in a large lead signal where the time derivative is large. It has been found that antiskid performance can be improved by taking steps to generate the lead signal as soon as possible after a new wheel speed signal is posted, as explained below.

The Reference Velocity and Error Signal Determination block (Part 4 of Table 1) generates a reference signal in response to the wheel signal. This reference signal is related to the optimum wheel velocity for maximum braking efficiency. In general terms, this reference velocity is a slowly varying function of the recent skid history. The reference velocity is decreased at an increasing rate when there are few skids in order to increase the applied brake pressure and to increase braking efficiency. Conversely, when skids occur with excessive frequency the reference velocity is decreased at a decreasing rate, or is even increased, in order to prevent excessive skids. Because the reference velocity varies with time much more slowly than does the lead signal, time delays between the posting of a new wheel speed signal and determination of the reference velocity are less critical. This block also generates an error signal as a function of the difference between the wheel speed and the reference velocity. The magnitude and sign of the error signal indicate whether the braked wheel is entering a skid and, if so, how severely.

The Modulator Signal Determination block (Part 5 of Table 1) utilizes the error signal to determine a modulator signal which varies as a time integral function of the error signal. Thus, the modulator signal varies relatively smoothly and slowly with time. In operation, it is the modulator signal which sets the general trend of the brake pressure. Once again, the modulator signal is less time critical than the lead signal, because, being a time integral function, it changes in time more slowly than the lead signal, which is a time derivative function.

The Transient Signal Determination block is also responsive to the error signal. If the error signal grows too large, indicating that a skid is developing faster than the modulator can relax braking action, the transient signal is generated to reduce braking action sharply. Thus, the transient signal can vary more quickly than the modulator signal when necessary to arrest a sudden skid. For example, when a braked wheel enters a wet surface under heavy braking, the sudden reduction of the coefficient of friction between the tire and the support surface can induce a skid that the modulator alone cannot quickly arrest. In such cases, it is the transient control signal which quickly reduces braking action to arrest the skid. However, though more quickly varying than the modulator signal, the transient signal is still less time critical than the lead signal in this embodiment. In addition to the major blocks discussed above, the program of Table 1 also includes blocks (Parts 7, 8 and 9) for generating parameters used in determining the reference velocity, the lead signal, and the modulator signal.

Figure 2:
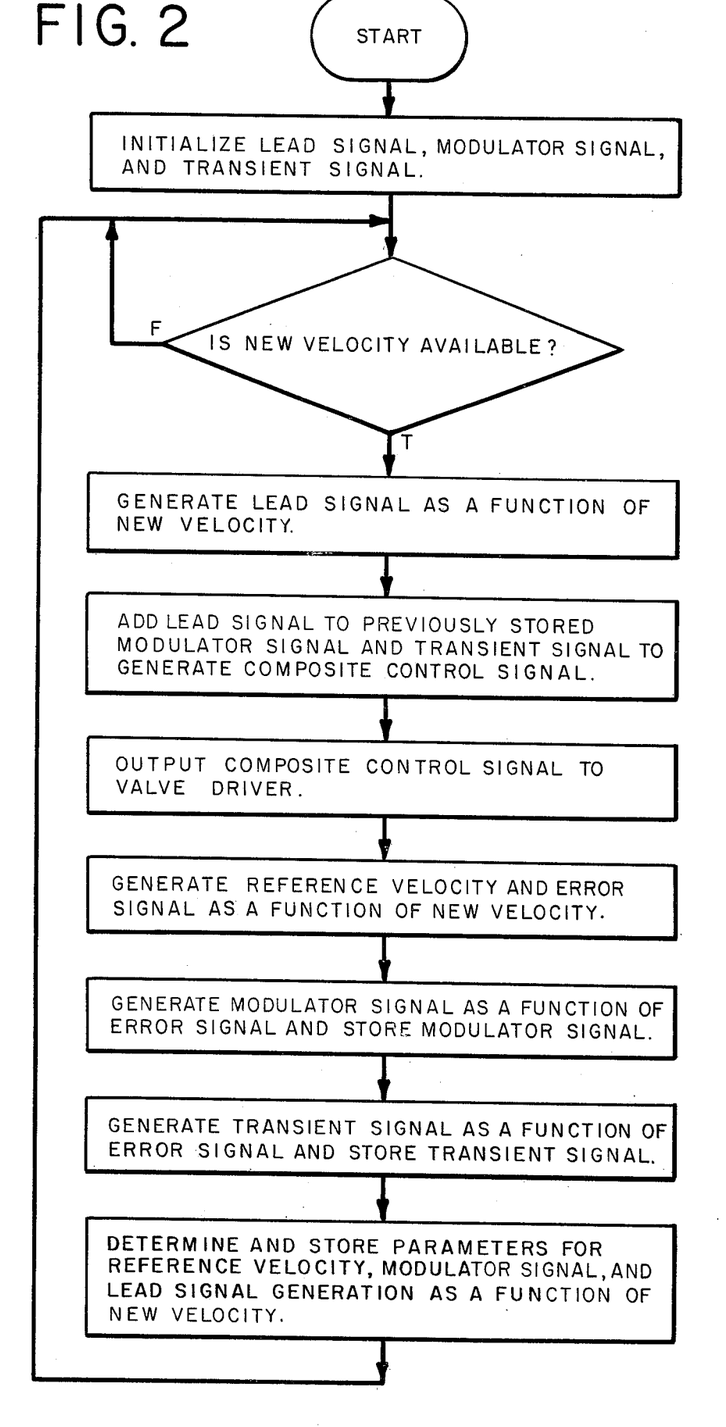
FIG. 2 is a flowchart of the program listed in Table 1 showing the sequence of operation of the antiskid control system of FIG. 1.

Turning now to FIG. 2, the control system of this preferred embodiment is arranged to minimize time delays between the posting of a new wheel speed signal and the generation of a new control signal which includes a revised lead signal based on the new wheel signal. As shown in FIG. 2, immediately following the posting of a new wheel speed signal, a new lead signal is generated as a function of the new wheel speed signal. This new lead signal is then immediately added to the stored modulator and transient signals, which were generated and stored in the last pass through the program, in order to generate a composite brake control signal which is then output to the valve driver 66.

Here it is important to note that only the lead signal is generated as a function of the new wheel signal before the composite brake control signal is generated and output. In this embodiment the lead signal is more time critical than either the modulator signal or the transient signal, and therefore this arrangement ensures that the most time critical intermediate control signal is generated and output in a timely manner.

Only after the composite control signal has been output are the remaining intermediate control signals updated and stored for use in conjunction with the next execution of the program. At this point the time critical functions have been accomplished and there is ample time for updating the modulator and transient control signals. First, the reference velocity and the error signal are generated as a function of the new wheel signal. Then the modulator signal and transient signal are generated as a function of the new error signal and stored, and finally various parameters are determined and stored for use in generating the next lead signal, modulator signal, and reference velocity. The program then waits for a new value of the wheel speed signal to be posted.

From the foregoing it should be apparent that this embodiment generates and stores for later use those intermediate control signals (the modulator and transient signals) which are not time critical in order that the time critical intermediate control signal (the lead signal) can be generated and output with minimum delay. In computer simulation it has been found that this arrangement improves antiskid efficiency.

The preferred embodiment described above is a slip velocity based antiskid system which includes a modulator. However, it should be apparent that the present invention is not limited to such systems. On the contrary, the present invention can be advantageously used in acceleration based antiskid systems as well as in other control systems which include means for generating at least two intermediate control signals, where one of the intermediate control signals is more time critical than the other.

Of course, it should be understood that various changes and modifications to the preferred embodiment described above will be apparent to those skilled in the art. Such changes and modifications can be made without departing from the spirit and scope of the present invention, and without diminishing its attendant advantages. It is therefore intended that all such changes and modifications be covered by the following claims.

TABLE 1

```
;
;       1. FIRST ORDER LEAD
;       *******************
;
LEAD1X  LD  DE,(VELOC2)
        LD  HL,(VELOC1)
        XOR A
        SBC HL,DE
        JR  NC,LEAD1A
        ADD HL,HL
        ADD HL,HL
        LD  D,H
        LD  E,L
        ADD HL,HL
        ADD HL,DE
        NOP
        NOP
        NOP
        NOP
        NOP
        NOP
        NOP
        LD  B,(IY+VGAIN1-RAM) ; GET MULTIPLIER FOR GAIN COMPENSATION
LEAD1C  ADD HL,DE
        DJNZ LEAD1C
;
        LD  A,MAXLEAD ; CLAMP IF LEAD IS TOO BIG
        CP  H
        JR  C,LEAD1D
        LD  HL,MAXLEAD*256
;
LEAD1D  LD  BC,(COMPOS) ; GET COMPOSITE SIGNAL VALUE
        ADD HL,BC
        JR  C,LEAD1B
        LD  HL,0
        JR  LEAD1B
```

```
        LEAD1A   NOP
                 NOP
                 NOP
                 LD D,H
                 LD E,L
                 NOP
                 NOP
                 ADD HL,DE
                 NOP
                 NOP
                 NOP
                 NOP
                 LD BC,(COMPOS)
                 ADD HL,BC
                 JR NC,LEAD1B
                 LD HL,0FFFH
        LEAD1B   LD B,H
                 LD C,L
        ;
        ;        2. SECOND ORDER LEAD
        ;        ********************
        ;
        LEAD2X   LD HL,(VELOC1); GET NEW VELOCT?
                 LD DE,(VELOC3); GET OLD VELOCITY
                 ADD HL,DE
                 LD DE,(VELOC2)
                 XOR A; CLEAR CARRY
                 SBC HL,DE
                 XOR A
                 SBC HL,DE
                 PUSH AF; SAVE FLAGS
                 ADD HL,HL
                 LD D,H
                 LD E,L
                 ADD HL,HL
                 PUSH BC
                 LD B,(IY+VGAIN2-RAM)
        LEAD2B   ADD HL,DE
                 DJNZ LEAD2B
                 POP BC
                 POP AF
                 JR C,LEAD2A
                 LD A,MAX2LD; CLAMP VALUE
                 CP H
                 JR NC,LEAD2C; SKIP IF LESS
                 LD HL,MAX2LD*256
        LEAD2C   ADD HL,BC
                 JR SUMX
        ;
        LEAD2A   LD A,MIN2LD; MINIMUM CLAMP
                 CP H
                 JR C,LEAD2D
                 LD HL,MIN2LD*256
        LEAD2D   ADD HL,BC
                 JR C,SUMX
                 LD HL,0
        ;
        ;        3. SCALE AND ADD BIAS CURRENT
        ;        *****************************
        ;
        SUMX     LD A,H
                 CP 10H
                 JR C,SUMA
                 LD HL,0FFFH
        SUMA     ADD HL,HL
                 ADD HL,HL
                 ADD HL,HL
                 ADD HL,HL
```

```
        LD A,H
        CPL
        ADD A,BIAS;    ADD BIAS CURRENT
        JR NC,SUMB
        LD A,0FFH
;
SUMB    OUT (VLVPRT),A; OUTPUT VALVE CURRENT
        LD (VALVE),A; SAVE FOR SELFTEST
;
;       4. REFERENCE UPDATE AND ERROR CALCULATION
;       ******************************************
;
REFX    LD HL,VELOC2
        LD B,7 ;    LOOP COUNT
        EXX
        LD DE,(VELOC1)
        LD B,D
        LD C,E
        EXX
;
REFA    LD A,(HL) ; SET LOW BYTE
        EX AF,AF
        INC HL
        LD A,(HL) ; SET HIGH BYTE
        INC HL
        EXX
        LD H,A
        EX AF,AF
        LD L,A ; MOVE VELOCITY TO HL
        CP A
        SBC HL,DE ; COMPARE WITH MAX
        JR NC,REFB
        ADD HL,DE ; RECOVER NEW VELOCITY
        JR REFC
REFB    ADD HL,DE ; RECOVER NEW VELOCITY
        LD D,H
        LD E,L
REFC    CP A
        SBC HL,BC ; COMPARE WITH MIN VELOCITY
        JR NC,REFD
        LD C,A
        EX AF,AF
        LD B,A ;    SAVE NEW AS MIN
REFD    EXX
        INC HL ;    SKIP EVERY OTHER VELOCITY IN BLOCK
        INC HL
        DJNZ REFA ; LOOP FOR WHOLE VELOCITY BLOCK
;
        EXX
        LD H,D
        LD L,E ; MOVE MAX VELOCITY
        XOR A
        SBC HL,BC ; GET DIFFERENCE
        EX DE,HL
        ADD HL,BC
        SRL D
        RR E ;    DIVIDE BY 2
        XOR A
        SBC HL,DE
        SRL D
        RR E
        ADD HL,DE
        SRL D
        RR E
        XOR A
        SBC HL,DE
        NOP
        NOP
```

```
        NOP
        NOP
        NOP
        SRL H
        RR L
        LD DE,(REFER+1)
        XOR A
        SBC HL,DE
        JR C,REFE
        LD C,L
        LD L,H
        LD H,0
        LD A,(FORTIM); GET TIMER VALUE
        CP 0
        JR NZ,REFK
        JR REFF; FINE TUNE ADDRESS AND TAKE OUT WHEN FINALIZED
        SLA C
            ADC HL,HL
            SLA C
            ADC HL,HL
REFF        SLA C
            ADC HL,HL
        SLA C
            ADC HL,HL
REFK        SLA C
            ADC HL,HL
            SLA C
            ADC HL,HL
            SLA C
            ADC HL,HL
            LD A,(REFER)
            ADD A,C
            ADC HL,DE
            LD (REFER+1),HL;   UPDATE REFERENCE
            LD (REFER),A
            LD DE,RTDOWN
            JR REFG
;
;       REFERENCE RAMP DOWN
;
REFE    EX DE,HL ;   MOVE REFERENCE TO HL
        LD A,(RAMP)
        LD C,A
        LD A,(REFER);         GET SCALER
        LD DE,0
        SUB C
        SBC HL,DE;     SUBTRACT CARRY IF ANY
        JR C,REFH
        SUB C
        SBC HL,DE
        JR NC,REFI
REFH    LD HL,0
REFI    LD (REFER),A; SAVE NEW SCALER
        LD (REFER+1),HL; SAVE NEW REFERENCE
        LD DE,RTUP
;
REFG    LD (SCORE),DE
;
        LD DE,MAXREF; REFERENCE LIMIT (ANY SPEED ABOVE
;                          THIS CONSTITUTES A FAILURE)
        EX DE,HL
        XOR A
        SBC HL,DE
        JR NC,REFJ; JUMP, REFERENCE WITHIN RANGE
        LD DE,MAXREF; OTHERWISE CLAMP REFERENCE
;                         (IN FULL VERSION THIS WOULD
;                         ALSO GET FLAGGED OUT AS A FAILURE)
```

```
            LD (REFER+1),DE
REFJ        LD HL,(VELOC1); GET VELOCITY
            XOR A
            SBC HL,DE
            LD (ERROR),HL
;
;           5. PBM FUNCTION
;           **************
;
PBMX        LD HL,(ERROR)
            LD D,0
            LD E,(IY+SLIP-RAM);    PBM THRESHOLD VALUE
            ADD HL,DE
            EX DE,HL
            BIT 7,D
            JR NZ,PBMA;      JUMP IF NEG (REF > VELOCITY)
            LD HL,PBMTHR1; POSITIVE THRESHOLD 1
            XOR A
            SBC HL,DE
            JR C,PBMB
            LD HL,PBMRTE1; POSITIVE RATE 1
            JR PBMC
PBMB        LD HL,PBMTHR2; THRESHOLD 2
            XOR A
            SBC HL,DE
            JR C,PBMD
            LD HL,PBMRTE2; RATE 2
            JR PBMC
PBMD        LD HL,PBMTHR3; THRESHOLD 3
            XOR A
            SBC HL,DE
            JR C,PBMI
            LD HL,PBMRTE3
            JR PBMC
PBMI        LD HL,PBMTHR4
            XOR A
            SBC HL,DE
            JR C,PBMJ
            LD HL,PBMRTE4
            JR PBMC
PBMJ        LD HL,PBMRTE5
PBMC        LD DE,(PBM)
            ADD HL,DE
            BIT 7,H;         CHECK FOR OVERFLOW
            JR Z,PBME
            LD HL,7FFFH;     CLAMP TO MAX
            JR PBME
PBMA        LD HL,-PBMTHR1; NEGATIVE THRESHOLD 1
            XOR A
            SBC HL,DE
            JR NC,PBMF
            LD HL,-PBMRTE1; NEGATIVE RATE 1
            JR PBMG
PBMF        LD HL,-PBMTHR2; THRESHOLD 2
            XOR A
            SBC HL,DE
            JR NC,PBMH
            LD HL,-PBMRTE2; RATE 2
            JR PBMG
PBMH        LD HL,-PBMTHR3
            XOR A
            SBC HL,DE
            JR NC,PBMK
            LD HL,-PBMRTE3
            JR PBMG
PBMK        LD HL,-PBMTHR4
            XOR A
            SBC HL,DE
```

```
              JR NC,PBML
              LD HL,-PBMRTE4
              JR PBMG
PBML          LD HL,-PBMRTE5
PBMG          LD DE,(PBM)
              ADD HL,DE
              BIT 7,H;         CHECK FOR OVERFLOW
              JR Z,PBME
              LD HL,0;         CLAMP TO MIN VALUE
PBME          EX DE,HL
              LD HL,MAXPBM; PBM CLAMP VALUE
              XOR A
              SBC HL,DE
              JR C,PBMM; VALUE GOOD, JUMP
              LD DE,MAXPBM
PBMM          LD (PBM),DE
              SRL D
              RR E
              SRL D
              RR E
              SRL D
              RR E
              LD B,D
              LD C,E;          SAVE SUM IN "BC"
;
;
;       6. TRANSIENT CONTROL
;       ********************
;
              LD HL,(ERROR)
              LD DE,TRTHR;     TRANSIENT THRESHOLD
              ADD HL,DE
              BIT 7,H
              JR Z,TRNSA;      JUMP IF POSITIVE- INCREASE PRESSURE
              NOP
              NOP
              NOP
              ADD HL,HL
              JR NC,TRNSC
              ADD HL,HL
              JR NC,TRNSC
              ADD HL,HL; CORRESPONDS TO 1.07 MA/FT/SEC OF ERROR BEYOND THRESHOLD
              JR NC,TRNSC
              LD A,H
              CP 0FH
              JR NC,TRNSD
TRNSC         LD HL,0FFFH
TRNSD         ADD HL,BC
              JR C,TRNSB
              LD HL,0
              JR TRNSB
;
TRNSA         LD HL,0
TRNSF         ADD HL,BC
              BIT 4,H
              JR Z,TRNSB
              LD HL,0FFFH
TRNSB         LD (COMPOS),HL
;
;       7.  AVERAGE DECEL CALCULATION
;       *****************************
;
              LD A,(FORTIM)
              CP 0
              JR NZ,AVDECC
              LD DE,(SCORE)
              LD HL,(DECEL)
              ADD HL,DE
              LD (DECEL),HL
```

```
        EX DE,HL
        BIT 7,D
        JR Z,AVDECB
        LD DE,0
        JR AVDECA
AVDECB  LD HL,MAXDEC*256
        XOR A
        SBC HL,DE
        JR NC,AVDECA
AVDECC  LD DE,MAXDEC*256
AVDECA  LD (DECEL),DE
        LD A,D
        ADD A,MINDEC
        LD (RAMP),A
;
;       8.   LEAD GAIN COMPENSATION
;       *****************************
;
TORQX   LD DE,(PBM)
        SRL D
        SRL D
        LD HL,TABLE1
        LD E,D
        LD D,0
        ADD HL,DE
        LD A,(HL)
        LD (VGAIN1),A
        LD HL,TABLE3
        ADD HL,DE
        LD A,(HL)
        LD (VGAIN2),A
;
;       9.   PBM THRESHOLD GENERATION
;       *****************************
;
        LD HL,(VELOC1)
        LD A,H
        CP MAXVEL/256
        JR C,TORQA
        LD HL,MAXVEL
TORQA   SLA L
        RL H
        SLA L
        RL H; MULTIPLY BY 4
        LD L,H
        LD H,0; DIVIDE BY 256
        LD DE,TABLE2
        ADD HL,DE
        LD A,(HL)
        LD (SLIP),A; SAVE THRESHOLD VALUE
;
        RET; RETURN TO MAIN CONTROL (END OF WHEEL LOOP)
;
;       VARIABLE FIRST ORDER LEAD GAIN LOOK UP TABLE
;       ********************************************
;
TABLE1  BYTE 2,2,2,2,2,3,3,3,4,4,4,4,5,5,5,5,8,8,8,8,10,10,10,10

BYTE 10,10,10,10,10,10,10,10

;
;       VARIABLE PBM THRESHOLD LOOK UP TABLE
;       *************************************
;
```

```
;        THRESHOLD   VELOCITY
;       (FT/SECX10)   (FT/SEC)
TABLE2  BYTE 8;  0-6.3
        BYTE 8;  12.7
        BYTE 8;  19.1
        BYTE 7;  25.5
        BYTE 6;  31.9
        BYTE 5;  38.3
        BYTE 5;  44.7
        BYTE 4;  51.1
        BYTE 4;  57.5
        BYTE 4;  63.9
        BYTE 4;  70.3
        BYTE 4;  76.7
        BYTE 4;  83.1
        BYTE 4;  89.5
        BYTE 4;  95.4
        BYTE 4;  102.3
        BYTE 4;  108.7
        BYTE 4;  115.1
        BYTE 4;  121.5
        BYTE 5;  127.9
        BYTE 5;  134.3
        BYTE 5;  140.7
        BYTE 5;  147.1
        BYTE 6;  153.5
        BYTE 6;  159.9
        BYTE 6;  166.3
        BYTE 6;  172.7
        BYTE 7;  179.1
        BYTE 7;  185.5
        BYTE 8;  191.9
        BYTE 8;  198.3
        BYTE 8;  204.7
        BYTE 9;  211.1
        BYTE 9;  217.5
        BYTE 9;  223.9
        BYTE 9;  230.3
        BYTE 9;  236.7
;
TABLE3  BYTE 2,2,2,2,2,3,3,3,4,4,4,4,5,5,5,5,8,8,8,8,10,10,10,10

BYTE 10,10,10,10,10,10,10,10
;
;       *******
;       *     *
;       * RAM *
;       *     *
;       *******
;
RAM     EQU 800H; BEGINNING OF RAM
REFER   EQU 807H; REFERENCE (THREE BYTES)
PBM     EQU 80AH; PBM VALUE (TWO BYTES)
VALVE   EQU 80CH; VALVE CURRENT FOR SELF TEST
DECEL   EQU 80EH; AVERAGE DECEL VALUE (TWO BYTES)
RAMP    EQU 810H; TIME CONSTANT FOR REFERENCE RATE
FORTIM  EQU 811H; TIMER FOR SLOW REFER. UPDATE
COMPOS  EQU 812H; COMPOSITE VALUE (TWO BYTES)
ERROR   EQU 815H; ERROR VALUE FOR CONTROL (TWO BYTES)
VGAIN1  EQU 817H; FIRST ORDER GAIN COMPENSATION MULTIPLIER
SLIP    EQU 819H; SLIP VELOCITY VALUE (ONE BYTE)
SCORE   EQU 81BH; TEMP STORAGE FOR REFER RATE GENERATION (TWO BYTES)
VGAIN2  EQU 81DH; GAIN COMPENS. MULTIPLIER
;
```

```
VELOC1  EQU  820H;  NEW VELOCITY
VELOC2  EQU  822H;  PREVIOUS VELOCITY (ONE LOOP TIME BACK)
VELOC3  EQU  824H;       "         "  (TWO LOOP TIMES BACK)
VELOC4  EQU  826H;       "         "  (THREE LOOP TIMES BACK)
VELOC5  EQU  828H;       "         "  (FOUR LOOP TIMES BACK)
VELOC6  EQU  82AH;       "         "  (FIVE LOOP TIMES BACK)
VELOC7  EQU  82CH;       "         "  (SIX LOOP TIMES BACK)
VELOC8  EQU  82EH;       "         "  (SEVEN LOOP TIMES BACK)
VELOC9  EQU  830H;       "         "  (EIGHT LOOP TIMES BACK)
VELOC10 EQU  832H;       "         "  (NINE LOOP TIMES BACK)
VELOC11 EQU  834H;       "         "  (TEN LOOP TIMES BACK)
VELOC12 EQU  836H;       "         "  (ELEVEN LOOP TIMES BACK)
VELOC13 EQU  838H;       "         "  (TWELVE LOOP TIMES BACK)
VELOC14 EQU  83AH;       "         "  (THIRTEEN LOOP TIMES BACK)
VELOC15 EQU  83CH;       "         "  (FOURTEEN LOOP TIMES BACK)
VELOC16 EQU  83EH;       "         "  (FIFTEEN LOOP TIMES BACK)
;
;        ********
;        *      *
;        * PORTS *
;        *      *
;        ********
;
VLVPRT  EQU  0F4H; VALVE PORT
;
;        *********************
;        *                   *
;        * GENERAL CONSTANTS *
;        *                   *
;        *********************
;
MAXREF  EQU  0DACH;   CLAMP FOR MAX REFERENCE VALUE (350 FT/SEC)
TRTHR   EQU  60H;     TRANSIENT THRESHOLD OFFSET
BIAS    EQU  0;       BIAS CURRENT TO VALVE DRIVER
MINDEC  EQU  24; MINIMUM DECEL
MAXDEC  EQU  70H; MAXIMUM DECEL
MAXERR  EQU  48; CLAMP FOR MAXIMUM
MAXPBM  EQU  4736; MAX PBM CLAMP (SET AT 55 MA - 47 MA = 8 MA)
PBMTHR1 EQU  4; THRESHOLD 1 (.4 FT/SEC)
PBMTHR2 EQU  20; THRESHOLD 2 (2 FT/SEC)
PBMTHR3 EQU  40; THRESHOLD 3 (4 FT/SEC)
PBMTHR4 EQU  150; THRESHOLD 4 (15 FT/SEC)
;
PBMRTE1 EQU  32; RATE 1
PBMRTE2 EQU  40
PBMRTE3 EQU  80
PBMRTE4 EQU  128
PBMRTE5 EQU  256
RTUP    EQU  40H
RTDOWN  EQU  -200H
MAXLEAD EQU  0FDH ; CLAMP FOR LEAD VALUE (10 MA PRESS REDUCTION)
MAXVEL  EQU  2304; 230.4 FT/SEC VELOCITY CLAMP FOR PBM THRESHOLD
MAX2LD  EQU  6; MAX CLAMP FOR 2ND LEAD (2.5 MA)
MIN2LD  EQU  -6; MIN CLAMP FOR 2ND LEAD (-2.5 MA)
;
```

I claim:

1. A control apparatus responsive to input means for generating a periodically adjusted input signal, said input signal having a first input value at a first time and a second input value at a second time, subsequent to the first time, said apparatus comprising:
   first means, responsive to the input means, for generating a first intermediate control signal prior to the second time as a function of the first input value of the input signal;
   means for storing the first intermediate control signal prior to the second time;
   second means, responsive to the input means, for generating a second intermediate control signal after the second time as a function of the second input value of the input signal, said second intermediate control signal varying more rapidly with time than the first intermediate control signal; and
   means for generating an output control signal after generation of the second intermediate control signal as a function of both the stored first intermediate control signal and the second intermediate control signal;
   said first means, storing means, second means, and output control signal generating means cooperating to maintain the elapsed time between the second time and the generation of the output control signal at a sufficiently short interval such that the output control signal is generated before the second intermediate control signal becomes stale.

2. A control apparatus responsive to input means for generating an input signal which is posted on a periodic basis, said apparatus comprising:
   a digital computer;
   first means, included in the computer, for generating a first intermediate control signal prior to the posting of a next value of the input signal as a function of a first value of the input signal;
   means, included in the computer, for storing the first intermediate control signal prior to the posting of said next value of the input signal;
   second means, included in the computer, for generating a second intermediate control signal, promptly after said next value of the input signal is posted, as a function of said next value of the input signal, said second intermediate control signal varying more rapidly with time than the first intermediate control signal;
   means, included in the computer, for generating an output control signal, promptly after the second intermediate signal is generated, as a function of the stored first intermediate signal and the second intermediate signal.

3. The apparatus of claim 1 or 2 wherein the first means includes means for generating the first intermediate control signal as a time integral function of the input signal.

4. The apparatus of claim 1 or 2 wherein the second means includes means for generating the second intermediate control signal as a time derivative function of the input signal.

5. In an antiskid braking system including a braked wheel, means for periodically posting an input signal, and means, responsive to a composite control signal, for reducing the braking action applied to the wheel, the improvement comprising:
   a computer;
   means, included in the computer, for generating a modulator control signal as a time integral function of the input signal;
   means, included in the computer, for storing the modulator control signal at a first time;
   means, included in the computer, for generating a lead control signal as a time derivative function of the input signal, after a next value of the input signal is posted at a second time subsequent to the first time; and
   means, included in the computer, for generating the composite control signal after generation of the lead control signal as a function of both the stored modulator control signal and the lead control signal;
   said modulator control signal generating means, storing means, lead control signal generating means, and composite control signal generating means cooperating to maintain the elapsed time between the second time and the generation of the composite control signal at a sufficiently short interval such that the composite control signal is generated before the lead control signal becomes stale.

6. In an antiskid braking system including a braked wheel, means for periodically posting a wheel speed signal, and means, responsive to a composite control signal, for reducing the braking action applied to the wheel, the improvement comprising:
   a digital computer;
   means, included in the computer, for generating a reference signal;
   means, included in the computer, for generating an error signal as a function of the difference between the reference signal and the wheel speed signal;
   means, included in the computer, for generating a modulator signal as a time integral function of the error signal;
   means, included in the computer, for storing the modulator signal at a first time;
   means, included in the computer, for generating a transient signal as a function of the error signal;
   means, included in the computer, for storing the transient signal at a second time;
   means, included in the computer, for generating a lead signal as a time derivative function of the wheel speed signal, promptly after a next value of the wheel speed signal is posted subsequent to the first and second times;
   means, included in the computer, for generating a composite control signal, promptly after generation of the lead signal, as a function of the stored modulator signal, the stored transient signal, and the lead signal; and
   means for supplying the composite control signal to the means for reducing braking action promptly after generation of the composite control signal.

7. A method for generating an output control signal in response to a periodically posted input signal said input signal having a first input value at a first time and a second input value at a second time, subsequent to the first time, said method comprising the following steps:
   generating a first intermediate control signal prior to the second time as a function of the first input value of the input signal;
   storing the first intermediate control signal prior to the second time;
   generating a second intermediate control signal promptly after the second time as a function of the second input value of the input signal, said second intermediate signal varying more rapidly in time than the first intermediate signal; and generating an output control signal, promptly after generation of the second intermediate control signal, as a function of the stored intermediate control signal and the second intermediate control signal.

8. A method for generating an output control signal in response to a periodically posted input signal, comprising the following steps:
(a) generating a first intermediate control signal as a function of a first value of the input signal prior to the posting of a next value of the input signal;
(b) storing the first intermediate control signal prior to the posting of said next value of the input signal;
(c) then waiting until said next value of the input signal is posted;
(d) generating a second intermediate signal, promptly after said next value of the input signal is posted, as a function of said next value of the input signal, said second intermediate control signal varying more rapidly in time than the first intermediate control signal;
(e) generating an output control signal, promptly after the second intermediate control signal is generated, as a function of the stored first intermediate control signal and the second intermediate control signal;
(f) updating the first intermediate control signal as a function of said next value of the input signal;
(g) storing the updated first intermediate control signal;
(h) repeating steps (c)-(g).

9. A method for generating a composite brake control signal in an antiskid system in response to a periodically posted input signal, comprising the following steps:
(a) generating a modulator signal as a time integral function of the input signal;
(b) storing the modulator signal;
(c) waiting until a next value of the input signal is posted;
(d) generating a lead signal, promptly after the next value of the input signal is posted, as a function of the next value of the input signal;
(e) generating a composite brake control signal, promptly after the lead signal is generated, as a function of the stored modulator signal and the lead signal;
(f) updating the modulator signal as a function of the next value of the input signal;
(g) storing the updated modulator signal; and
(h) repeating steps (c)-(g).

10. A method for generating a composite brake control signal in an antiskid system in response to a periodically posted wheel signal, comprising the following steps:
(a) generating a reference signal as a function of the wheel signal;
(b) generating an error signal as a function of the difference between the reference signal and the wheel signal;
(c) generating a modulator signal as a time integral function of the error signal;
(d) generating a transient control signal as a function of the error signal;
(e) storing the modulator signal and the transient control signal;
(f) then waiting until a next value of the wheel signal is posted;
(g) generating a lead signal, promptly after the next value of the wheel signal is posted, as a function of the next value of the wheel signal;
(h) generating a composite brake control signal, promptly after the lead signal is generated, as a function of the stored modulator signal, the stored transient signal, and the lead signal;
(i) updating the reference signal, the error signal, the modulator signal, and the transient signal as a function of the next value of the wheel signal;
(j) storing the updated modulator signal and the updated transient signal; and
(k) repeating steps (g)-(j).

11. A control apparatus responsive to input means for generating a periodically adjusted input signal, said input signal having a first input value at a first time and a second input value at a second time, subsequent to the first time, said apparatus comprising:
first means, responsive to the input means, for generating a first intermediate control signal prior to the second time as a function of the first input value of the input signal;
means for storing the first intermediate control signal prior to the second time;
second means, responsive to the input means, for generating a second intermediate control signal after the second time as a function of the second input value of the input signal, said second intermediate control signal varying more rapidly with time than the first intermediate control signal; and
means for generating an output control signal after generation of the second intermediate control signal as a function of both the stored first intermediate control signal and the second intermediate control signal;
said first means, storing means, second means, and output control signal generating means cooperating to maintain the elapsed time between the second time and the generation of the output control signal at a value less than the sum of the time required for the first means to generate the first intermediate control signal, the time for the second means to generate the second intermediate control signal, and the time for the control signal generating means to generate the control signal.

12. In an antiskid braking system including a braked wheel, means for periodically posting an input signal, and means, responsive to a composite control signal, for reducing the braking action applied to the wheel, the improvement comprising:
a digital computer;
means, included in the computer, for generating a modulator control signal as a time integral function of the input signal;
means, included in the computer, for storing the modulator control signal at a first time;
means, included in the computer, for generating a lead control signal as a time derivative function of the input signal, after a next value of the input signal is posted at a second time subsequent to the first time; and
means, included in the computer, for generating the composite control signal after generation of the lead control signal as a function of both the stored modulator control signal and the lead control signal;

said modulator control signal generating means, storing means, lead control signal generating means, and composite control signal generating means cooperating to maintain the elapsed time between the second time and the generation of the composite control signal at a value less than the sum of the time required for the modulator control signal generating means to generate the modulator control signal, the time required for the lead control signal generating means to generate the lead control signal, and the time required for the composite control signal generating means to generate the composite control signal.

* * * * *

UNITED STATES PATENT AND TRADEMARK OFFICE
CERTIFICATE OF CORRECTION

PATENT NO. : 4,338,670
DATED : July 6, 1982
INVENTOR(S) : Thomas Skarvada

It is certified that error appears in the above—identified patent and that said Letters Patent is hereby corrected as shown below:

Column 11, lines 1-17 should be moved to the right 7 spaces to line up with line 18.

Column 17, lines 1-5 should be moved to the right 7 spaces to line up with line 7.

Column 25, line 5, insert the word --first-- immediately before the word "intermediate".

Signed and Sealed this

Eleventh Day of January 1983

[SEAL]

Attest:

GERALD J. MOSSINGHOFF

Attesting Officer    Commissioner of Patents and Trademarks